(12) United States Patent
Morin et al.

(10) Patent No.: US 6,983,623 B2
(45) Date of Patent: Jan. 10, 2006

(54) VALVE BLOCK ASSEMBLY FOR I.S. GLASSWARE MACHINE AND MODULAR PILOT VALVE OPERATED POPPET VALVE ASSEMBLY

(75) Inventors: Gerald R. Morin, Glastonbury, CT (US); Richard Alan Walker, North Granby, CT (US)

(73) Assignee: SG Alternatives, LLC, East Hartford, CT (US)

( * ) Notice: Subject to any disclaimer, the term of this patent is extended or adjusted under 35 U.S.C. 154(b) by 423 days.

(21) Appl. No.: 10/125,905

(22) Filed: Apr. 18, 2002

(65) Prior Publication Data

US 2003/0196457 A1   Oct. 23, 2003

(51) Int. Cl.
*F16K 31/12* (2006.01)

(52) U.S. Cl. ............... 65/158; 65/172; 137/596.16; 137/625.6; 137/625.64; 137/881; 137/882

(58) Field of Classification Search .............. 65/158, 65/172; 137/625.6, 625.64, 596.16, 881, 137/882
See application file for complete search history.

(56) References Cited

U.S. PATENT DOCUMENTS

| | | | |
|---|---|---|---|
| 3,918,489 A | | 11/1975 | Foster et al. |
| 4,100,937 A | | 7/1978 | Mallory |
| 4,362,544 A | * | 12/1982 | Mallory ................ 65/163 |
| RE31,529 E | * | 3/1984 | Lowe ................. 137/884 |
| 4,478,241 A | * | 10/1984 | Cardenas-Franco et al. 137/340 |
| 5,320,130 A | * | 6/1994 | Borbone ................ 137/220 |
| 5,582,209 A | | 12/1996 | Borbone |
| 6,142,185 A | | 11/2000 | Meyer |
| 6,269,662 B1 | | 8/2001 | Pinkerton et al. |
| 2002/0129856 A1 | * | 9/2002 | Reinelt et al. ......... 137/596.16 |

* cited by examiner

*Primary Examiner*—Sean Vincent

(57) ABSTRACT

A valve block assembly includes a cartridge block and a plurality of modular pilot valve operated poppet valve assemblies. The cartridge block has a plurality of bores therein dimensioned and configured for receiving respective modular pilot valve operated poppet valve assemblies. The cartridge block has a first side and each of the bores extend from the first side into the cartridge block. Each of the modular pilot valve operated poppet valve assemblies having a supply air port, an operating air out port and an exhaust passage and each of the modular pilot valve operated poppet valve assemblies are accessible for installation and removal from the cartridge block from the first side. Other forms of the invention include a modular pilot valve operated poppet valve assembly for use with an associated valve block assembly of an associated glassware manufacturing machine which includes a solenoid control valve having an input port for connection to an associated source of pilot air and an outlet port, the solenoid control valve having a first position and a second position, the position changing in response to being energized and a poppet valve having a first port for connection to an associated source of control air, a second port for connection to associated apparatus being controlled and a third port for exhaust air passing from the associated apparatus being controlled, and a poppet, the poppet having an axes and being mounted for axial movement responsive to air pressure at the outlet port of the solenoid control valve.

20 Claims, 8 Drawing Sheets

VALVE BLOCK ASSEMBLY FOR I.S. GLASSWARE MACHINE AND MODULAR PILOT VALVE OPERATED POPPET VALVE ASSEMBLY

BACKGROUND OF THE INVENTION

The invention relates to valve blocks and valve assemblies and particularly to valve blocks and pneumatic valves for controlling the operation of a glassware forming machine for manufacturing glass containers and more specifically to an I.S. (individual section) machine such as disclosed in U.S. Pat. No. 5,803,945. Modem glass container forming machines of the type IS (independent section), are controlled by controllers of various manufacture. One such pneumatic machine control unit is shown in U.S. Pat. No. 6,269,662. That patent describes an I.S. machine having at least one machine section for processing a gob of molten glass into a selected bottle. The section is supplied by a plurality of pneumatic lines at different pressures. A pneumatic supply input line supplies a manifold which is connected to a plurality of output lines. The interface between the controller and the I.S. section is a valve block assembly that usually includes twenty one independent valves.

An I.S. machine is made up of a number (8, 10, 12, . . . ) of identical sections each of which receives a gob of molten glass and forms the gob into a bottle. The bottle is formed in a two step process. The gob is received by a blank mold at a blank station and is formed into a parison having a threaded opening at the bottom (the finish). The blank station includes apposed pairs a of blankmold halves and the blow station includes apposed pairs of blowmold halves. Each of these mold halves is carried on an insert which is mounted on an arm or support which is displaceable between open and closed positions.

The parison is transferred by an invert/neck ring mechanism to the blow molds at a blow station which receives the parisons and forms them into bottles. Operating air is supplied to each section to operate individual section mechanisms. "High pressure" and "low pressure" air are required. When the two step process is the "press and blow" process, a plunger is advanced into the gob within the blank mold to form the parison with "plunger up air". Bottle making air is also required. Where the two step process is the "blow and blow" process "settle blow" air is required to settle the molten glass around the plunger. Additionally "final blow", "finish cooling", and "counter blow" air may be required. In addition, air may be required for associated section mechanisms such as the pushout (see U.S. Pat. No. 5,527,372 which uses pressurized air at the pockets ("pocket air"). These pneumatic services are channeled from a main supply into a plurality of manifolds that are located on or about the machine. Each manifold requires a pressure regulating device so that the pressure may be controlled as required for each function. In state of the art machines, each pressure regulating device is a part of the individual pneumatic service and is located to be convenient to that pneumatic service. As a result the regulating devices are scattered about the machine and each is individually settable by the operator.

The prior art valve blocks include the apparatus shown in U.S. Pat. No. 3,918,489 entitled "Valve Block" issued on Nov. 11, 1975; U.S. Pat. No. 4,100,937 entitled Valve Block issued on Jul. 18, 1978; U.S. Pat. No. 5,582,209 entitled "Valve Block Assembly" for I.S. machine issued on Dec. 10, 1996; and U.S. Pat. No. 6,142,185 entitled "Valve Block" issued on Nov. 7, 2000. The valve block shown in U.S. Pat. No. 3,918,489 is representative of typical prior art valve blocks. The apparatus includes twenty-one valve assemblies which each include a pilot-operated poppet valve controlled by a pilot air directed to the poppet valve by a solenoid-operated pilot valve. The twenty-one valve combinations are arranged in two rows. The apparatus includes separate cast blocks in which respectively a set of pilot valves and a set of set of poppet valves are disposed.

The prior art valve blocks have not been wholly satisfactory. The machines for manufacturing glassware require an extremely high capital investment. Accordingly, it is highly desirable to maximize the time the machine operates. Ideally the machines will operate at maximum capacity twenty four hours a day and seven days a week. Thus, ideally each pilot-operated poppet valve and each solenoid-operated pilot valve will accordingly operate approximately fourteen duty cycles per minute for each minute in each hour in each day of each year. Therefore, each of the twenty one poppet valves, each of the twenty one pilot valves and each of the twenty one solenoids in the prior apparatus will ideally function flawlessly at all times.

Even with the most careful design engineering and quality control this is not possible. In addition the construction of the prior art apparatus makes it difficult to access the poppet valves and pilot valves. The poppet valves are mounted in one block and the pilot valves are mounted in another block. A check of solenoid operation, for example, requires removal of a complete front cover containing switches, lamps and cables. Changing a poppet or pilot valve requires complete removal of the entire front cover, wiring harness and the solenoid block from the rest of the valve block assembly. The complications inherent in inspecting, testing and replacing these components increase the time required for maintenance resulting in downtime for the machine and less production from the capital intensive machine. In addition, the prior art valve block assembly constrains air flow to pilot and poppet valves which can affect the speed and precision of the I.S. machine operation.

The design of alternative valve block assemblies is complicated by the somewhat conflicting design constraints of extremely high reliability and limited available space imposed by the glassware manufacturing machine structure.

SUMMARY OF THE INVENTION

It is an object of the present invention to provide a valve block construction that enables a maintenance worker to more rapidly diagnose the operation of a valve block assembly and to repair or replace malfunctioning parts of the valve block assembly.

It is another object of the present invention to provide a valve block construction having a construction having less parts and thus inherently better reliability than the prior art construction.

Still another object invention is to provide a valve block which provides an improved flow path for air supplied to the poppet valves to minimize turbulence and thereby maximize precise operation thereof.

Yet another object invention is to provide apparatus that can be manufactured at a competitive price.

It is now been found that these and other objects of the invention may be attained in a valve block assembly for an I.S. glassware forming machine which includes a cartridge block and a plurality of modular pilot valve operated poppet valve assemblies. The cartridge block has a plurality of bores therein dimensioned and configured for receiving respective modular pilot valve operated poppet valve assemblies. The cartridge block has a first side and each of the bores extend from the first side into the cartridge block. Each of the modular pilot valve operated poppet valve assemblies having a supply air port, an operating air out port and an exhaust passage and each of the modular pilot valve operated poppet valve assemblies are accessible for installation and removal from the cartridge block from the first side.

In some forms of the invention the assembly further includes a wireway enclosure for enclosing an associated wiring harnesses within the envelope thereof for mounting associated controls, connectors and indicator displays.

The assembly may include structure for mounting the wireway enclosure to position the wireway enclosure proximate to the cartridge block and to position the wireway enclosure away from cartridge block.

The valve block assembly may include a plurality of pilot operated poppet valves that include a solenoid control valve having an input port for connection to an associated source of pilot air and an outlet port, the solenoid control valve having a first position and a second position, the position changing in response to being energized and a poppet valve having a first port for connection to an associated source of control air, a second port for connection to associated apparatus being controlled and a third port for exhaust air passing from the associated apparatus being controlled, and a poppet, the poppet having an axes and being mounted for axial movement responsive to air pressure at the outlet port of the solenoid control valve, the poppet being axially movable between a first position in which the first and second ports are in fluid communication and a second position in which the second and third ports are in fluid communication, the modular pilot valve operated poppet valve assembly having exterior surfaces that are substantially cylindrical.

Each of at least some of the modular pilot valve operated poppet valve assemblies may include solenoid control valves and poppet valves that are substantially rotationally symmetrical, each has an axis and the solenoid valve and the poppet valve are disposed in substantially coaxial relationship. In addition each of the plurality of modular pilot valve operated poppet valve has the solenoid valve and poppet valve disposed in substantially end abutting relationship. The assembly may include a cover dimensioned and configured for covering the wireway enclosure and engaging the cartridge block and the cover may have openings disposed in registered relationship to the controls.

In some forms of the valve block assembly for an I.S. glassware forming machine the assembly includes a cartridge block and a plurality of pilot valve operated poppet valve assemblies mounted within the cartridge block, each of the pilot valve operated poppet valve assemblies have a supply air port, an operating air out port and an exhaust passage the assembly also includes a wireway enclosure for holding an associated wiring harnesses within the envelope thereof and for mounting associated controls.

The valve block assembly may include apparatus for mounting the wireway enclosure to permit mounting of the wireway enclosure proximate to the cartridge block and movement of the wireway enclosure away from cartridge block.

Some forms of the valve block assembly further include a cover dimensioned and configured for covering the wireway assembly and engaging the cartridge block.

Other forms of the invention include a modular pilot valve operated poppet valve assembly for use with an associated valve block assembly of an associated glassware manufacturing machine which includes a solenoid control valve having an input port for connection to an associated source of pilot air and an outlet port, the solenoid control valve having a first position and a second position, the position changing in response to being energized; and a poppet valve having a first port for connection to an associated source of control air, a second port for connection to associated apparatus being controlled and a third port for exhaust air passing from the associated apparatus being controlled, and a poppet, the poppet having an axes and being mounted for axial movement responsive to air pressure at the outlet port of the solenoid control valve, the poppet being axially movable between a first position in which the first and second ports are in fluid communication and a second position in which the second and third ports are in fluid communication, the modular pilot valve operated poppet valve assembly having exterior surfaces that are substantially cylindrical.

BRIEF DESCRIPTION OF THE DRAWING

The invention will be better understood by reference to the accompanying drawing in which.

DETAILED DESCRIPTION OF THE PREFERRED EMBODIMENT

Figure 1:
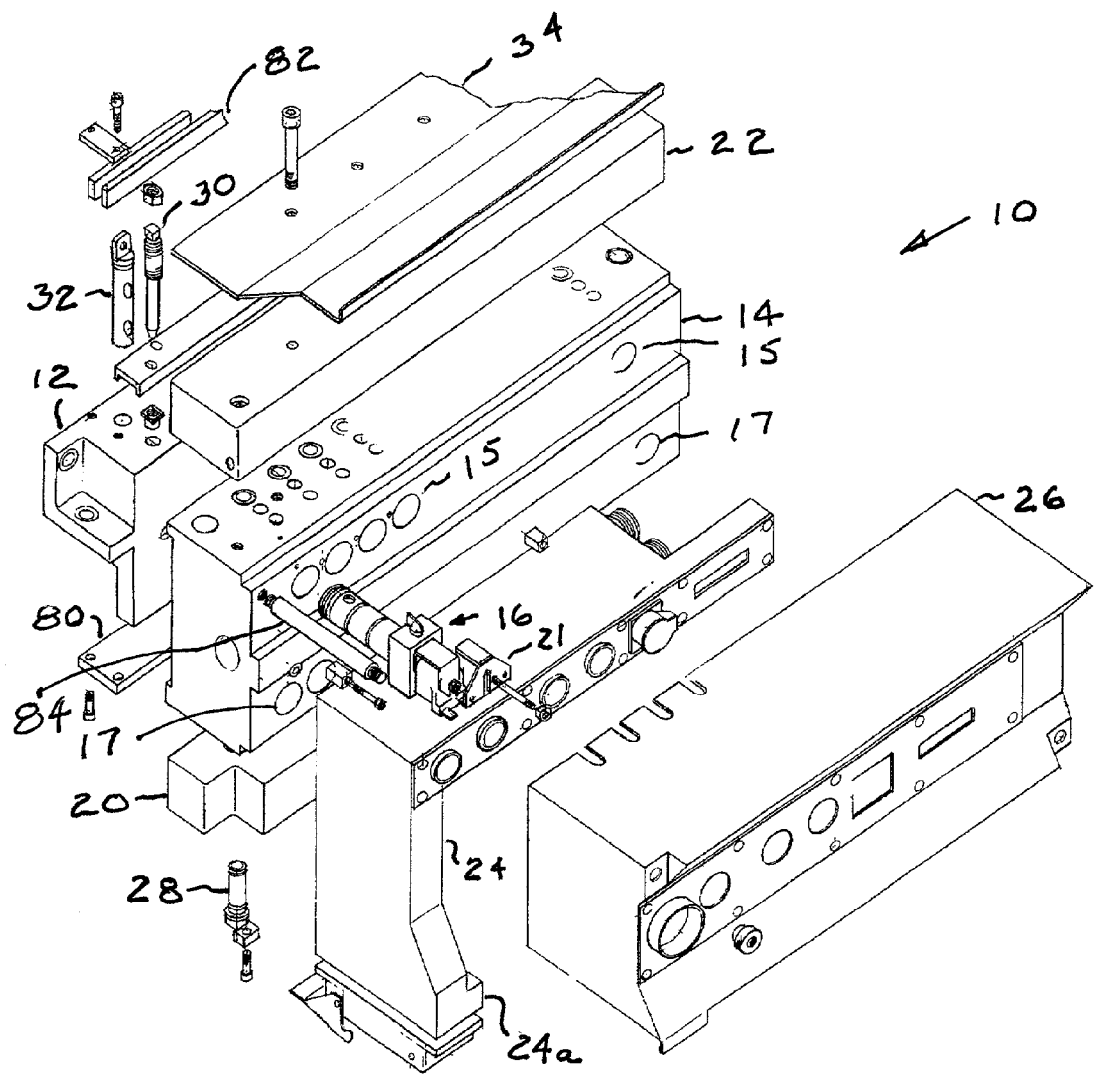
FIG. 1 an exploded simplified perspective view of the valve block in accordance with one form of the present invention.
Figure 2:
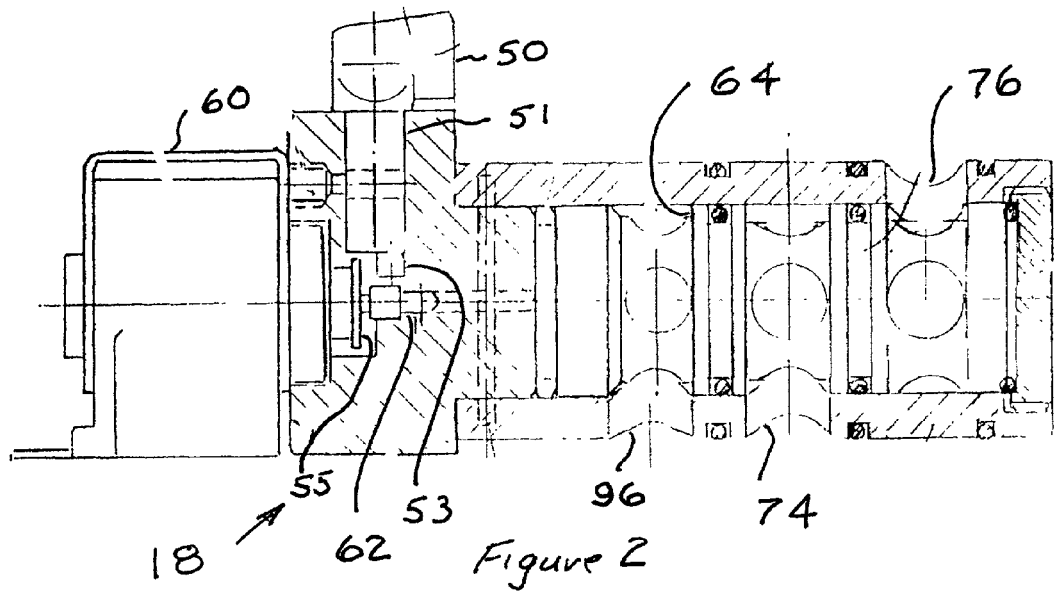
FIG. 2 is a partially section view of a modular pilot operated poppet valve assembly typical of each of ten assemblies commonly utilized in the upper part of the valve block assembly illustrated in FIGS. 1 and 4.
Figure 3:
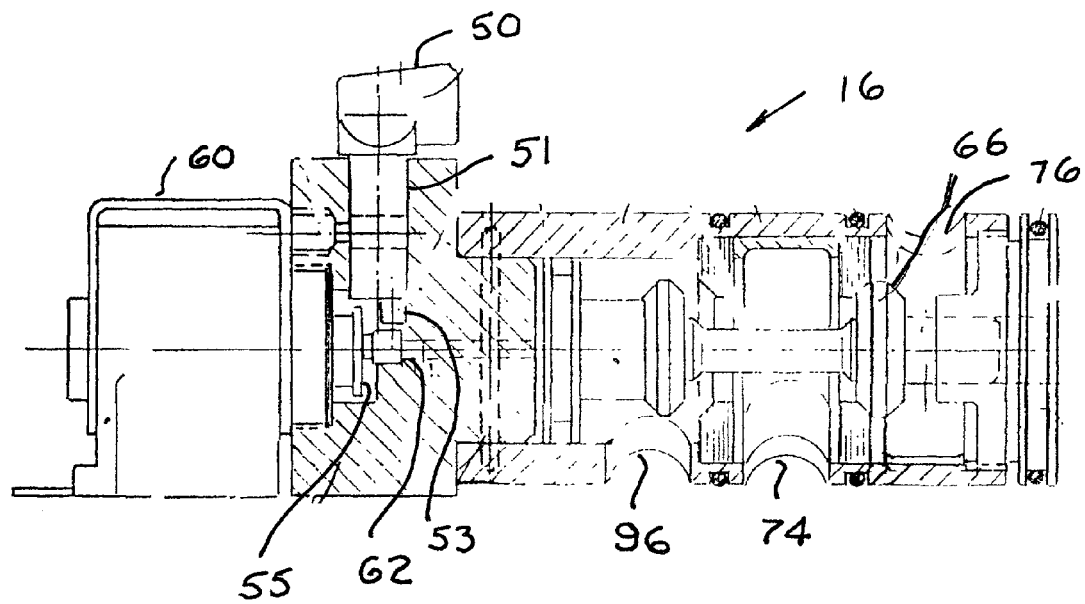
FIG. 3 is a partially sectional view of the modular pilot operated poppet valve assemblies typical of each of eleven assemblies commonly utilized in the lower part of the valve block assembly illustrated in FIGS. 1 and 4.
Figure 4:
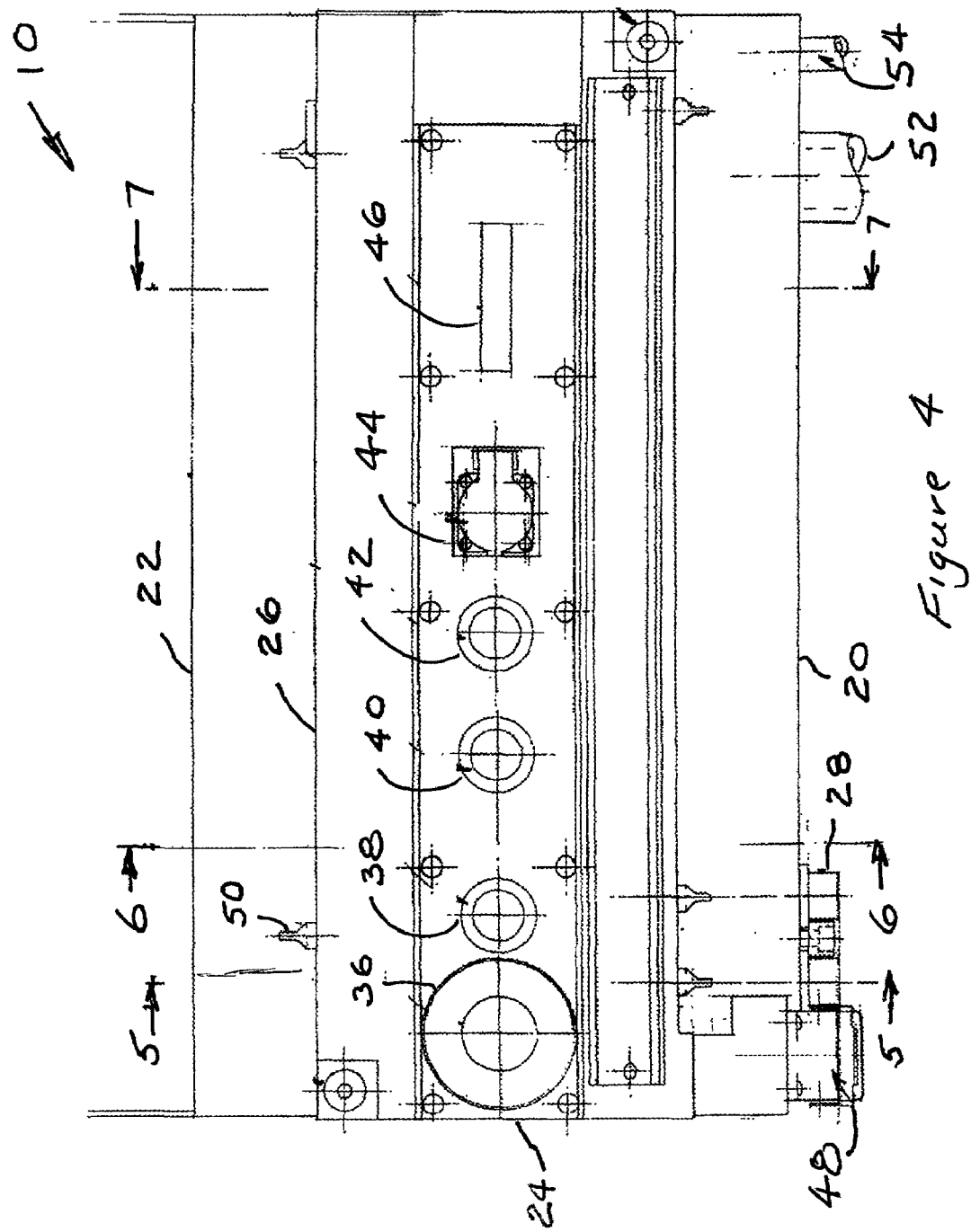
FIG. 4 is a front elevation view of the valve block assembly illustrated in FIG. 1.

Referring now to FIGS. 1–8 and particularly to FIGS. 1 and 4 there is shown a valve block assembly 10 that includes a control block 12 and a cartridge block 14. Although the apparatus of the present invention differs in many important respects from the prior art apparatus shown in U.S. Pat. No. 3,918,489 the basic operation shown therein is comparable to the present apparatus. Thus, an understanding of the apparatus therein, well known to those skilled in the art, will provide both a better understanding of the structure, manner of operation and advantages of the present apparatus. The disclosure of U.S. Pat. No. 3,918,489 is incorporated by reference herein.

Mounted within a cartridge block 14, in a preferred embodiment of the apparatus in accordance with the present invention, are eleven modular first pilot operated poppet valve assemblies 16 and ten second pilot operated poppet valve assemblies 18. The modular first pilot operated poppet valve assemblies 16 are mounted in cylindrical cavities 15 (five illustrative cavities shown) and the second pilot operated poppet valve assemblies 18 are mounted in cylindrical cavities 17 (two illustrated cavities shown). All the cavities 15 are cylindrical and disposed with the respective axes thereof disposed in mutually parallel relationship within a first plane. All the cavities 17 are cylindrical and disposed with respective axes thereof disposed in mutually parallel relationship in a second plane in the preferred embodiment. The first and second planes are disposed in parallel spaced relationship and all of the axes are mutually parallel. A discreet retainer 21 is provided to secure each of the modular first and second pilot operated valve assemblies 16, 18 in the cartridge block.

The modular first and second pilot operated valve assemblies 16, 18 are operated by a pilot air supply. The operation of these valves directs control air pressure to various mechanisms in the glassware machine and provides an exhaust pathway for the control air. Often the mechanism being operated by the operating air includes a bidirectional piston and cylinder (not shown).

Operating air pressure is supplied to the first modular pilot operated poppet valve assemblies 16 through an inlet 52 (shown in FIG. 4) to a lower manifold 20 or through an isolation sleeve 28 (one of which is shown in FIG. 1). The isolation sleeves 28 have air supplies that are independent of the inlet 52, lower manifold 20 and the upper manifold 22 to ensure precise control. Operating air supplied to the second pilot operated poppet valve assemblies 18 flows through the inlet 52 to the upper manifold 22 or passes through an isolation sleeve 28 (one of which is shown in FIG. 1). Operating air pressure from the isolation sleeves 28 is turned on and off by the first pilot operated poppet valve assemblies 16.

Pilot air for the modular first and second pilot operated poppet valve assemblies 16, 18 is supplied at an inlet 54 (shown in FIG. 4) and is distributed to all first and second pilot operated poppet valve assemblies 16, 18 through channels 56 and 58 that are in fluid communication respectively with the upper manifold 22 and lower manifold 20. Although the channels 56, 58 are physically within respectively the upper manifold 22 and the lower manifold 20 the air pressures in the primary part of the upper manifold 22 and the primary part of the lower manifold 20 are isolated from the air pressures in the respective channels 56, 58.

Each of the modular first and second pilot operated poppet valve assemblies 16, 18 include a solenoid 60 which is coupled directly to a valve 62. The valve 62 controls the flow of pilot air. All of the valves 62 are spring biased to a closed position. Thus, all of the valves 62 are normally closed.

As best seen in FIGS. 2 and 3 each of the modular first and second pilot operated poppet valve assemblies 16, 18 include an override 50 comprising a shaft 51 mounted for rotation on which an eccentric pin 53 is disposed. The rotation of the shaft 51 causes the eccentric pin 53 to engage a lip 55 on the valve 62 and thus override the solenoid 60.

The modular first and second pilot operated poppet valve assemblies 16, 18 are each provided with a supply air port 76 and an operating air port 74. Typically such valve block assemblies 10 include normally open and normally closed valve assemblies 16, 18 that differ not by changing the location of a spring but by differences in the contour of the poppet valve and the seats meshing with the poppet valve. The operation of the modular first and second pilot operated poppet valve assemblies 16, 18 is substantially similar. The differences in structure are dictated primarily by space and flow limitations.

The choice of a normally open or normally closed position depends on the requirements of the mechanism being operated by the individual modular solenoid and valve assembly 16, 18. The modular second pilot operated poppet valve assemblies 18, best seen in FIGS. 2 and 2A, include a sleeve 64. Disposed within each of the sleeves 64 is a normally open or normally closed poppet valve.

Figure 2A:
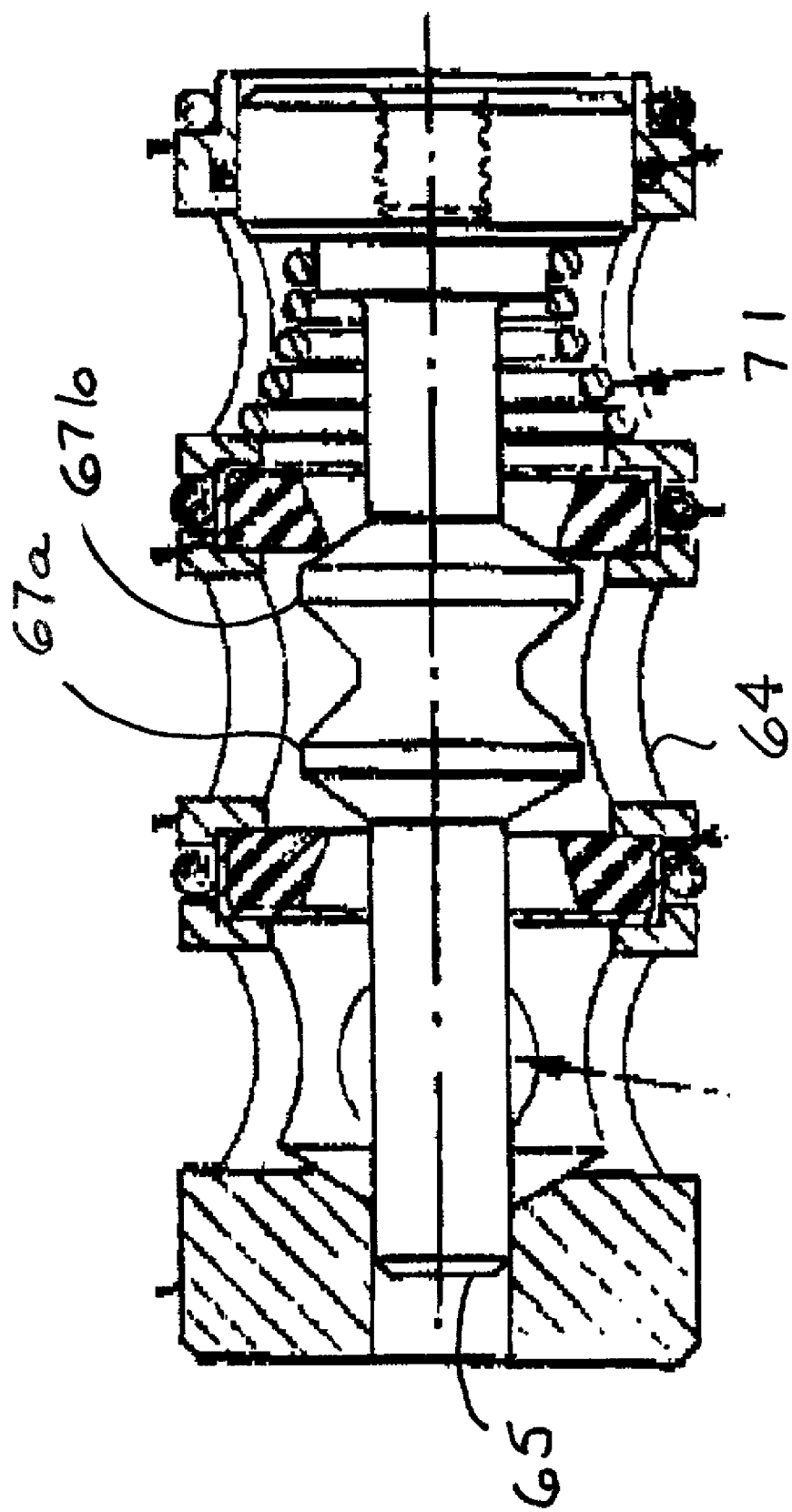
FIG. 2A is a section view of the internal structure of a normally open pilot operated poppet valve assembly illustrated in FIG. 2.
Figure 2B:
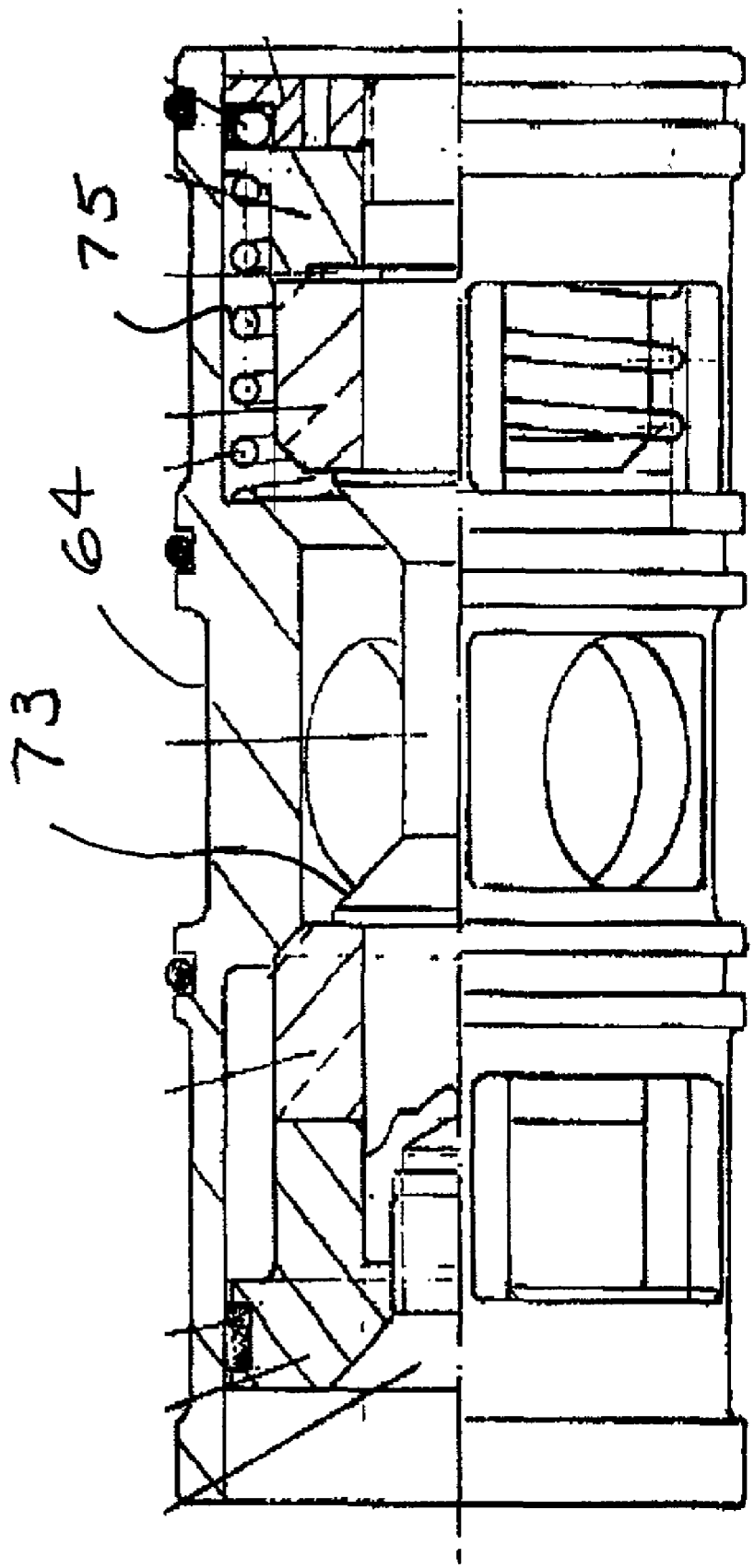
FIG. 2B is a section view of the internal structure of a normally closed pilot operated poppet valve assembly illustrated in FIG. 2

A preferred embodiment of a normally open poppet valve apparatus disposed within the sleeve 64 is illustrated in FIG. 2A. The structure includes a poppet 65 having two enlarged portions 67a, 67b. A spring 71 biases the poppet 65 to the right (as shown in FIG. 2A). A preferred embodiment of a normally closed poppet valve apparatus disposed within the sleeve 64 is illustrated in FIG. 2B. A poppet 73 is biased by a spring 75.

A preferred embodiment of a second pilot operated poppet valve assemblies 16 is illustrated in FIG. 3. Each modular pilot valve poppet valve assembly 16 includes a poppet 66 and a sleeve 76.

The operation of the various embodiments of the modular pilot operated poppet valve assemblies 16, 18 are similar. When the solenoid 60 is energized the valve 62 opens to allow air flow through the normally closed valve 62 causing air pressure on the left extremity of the poppets 65, 73, 66, as viewed respectively in FIGS. 2A, 2B, and 3. This air pressure causes axial movement of the respective poppets 65, 73, 66 to the right (as viewed). In the case of a normally closed modular second pilot operated poppet valve assembly 18 the respective poppets 65, 73, 66 move to the right (as viewed) there is fluid communication between the supply air port 76 and the operating air out port 74. When the solenoid 60 is deenergized the valve 62 closes causing air pressure to drop on the left extremity of the poppets 65, 73, 66 causing the poppets to move to the left (as viewed). Movement of the poppets 65, 73, 66 to the left causes fluid communication between the operating air out port 74 and the exhaust air port 78.

The operation of the second pilot operated poppet valve assemblies 18 is functionally equivalent to the operation of the first pilot operated poppet valve assemblies 16 as will be apparent to those skilled in the art. The construction of the modular first pilot operated poppet valve assembly 16 is somewhat preferable to the construction of the second pilot operated pilot valve assembly 18 because of superior air flow characteristics. However, in the preferred embodiment the construction of the second pilot operated pilot valve assembly 16 is preferred for installation in the cavities 15, because of space limitations within the structure.

The cartridge block 14 cooperates with a lower manifold 20 and an upper manifold 22. A wireway assembly 24 with a cooperating cover 26 is positioned at the front face of the valve block assembly 10. The assembly also includes an isolation sleeve 28 for delivery of control air pressure independently of the manifolds 20, 22. Various preferred embodiments of the present invention will include up to nine discrete isolation sleeves 28. The assembly also includes a control screw 30 and a flat check valve 32. A secondary cover 34 extends along the top of the valve block assembly 10.

A wireway assembly 24, also shown in FIG. 4, includes an emergency stop button 36, a power indicator light 38, a normal stop button and light 40, a normal start button and light 42, a connector 44 for an associated handheld terminal (not shown) and an associated display 46 disposed in generally aligned relationship. The button 36, light 38 button and light 40, the button and light 42, the connector 44 and display 46 are accessible at the front of the cover 26 through registered holes therein. A multi-pin connector 48 extends downwardly from a lower surface of the wireway assembly 24. A depending shroud 24a surrounds associated cables (not shown) connected to other parts of the apparatus. Removal of only four screws allows movement of the wireway assembly 24 away from the cartridge block 14.

One manual override 50 is visible in FIG. 4 at the top of the wireway assembly 24. This representation is illustrative of other manual override 50 that are physically part of respective first and second pilot operated poppet valve assemblies 16, 18.

The structure in accordance with the present invention allows easy, simple and fast removal of each modular pilot operated poppet valve assemblies 16, 18 without the need for any further disassembly of the valve block assembly 10. Individual retainers 21 secure each modular pilot operated poppet valve assemblies 16, 18 to the cartridge block 14. The structure does not even require movement of the wireway assembly 24 to access any retainer 21. The structure in accordance with the present invention also allows easy, simple and fast removal of the cover 26 followed by removal of the wireway assembly 24 for other maintenance purposes.

Figures 5, 8:
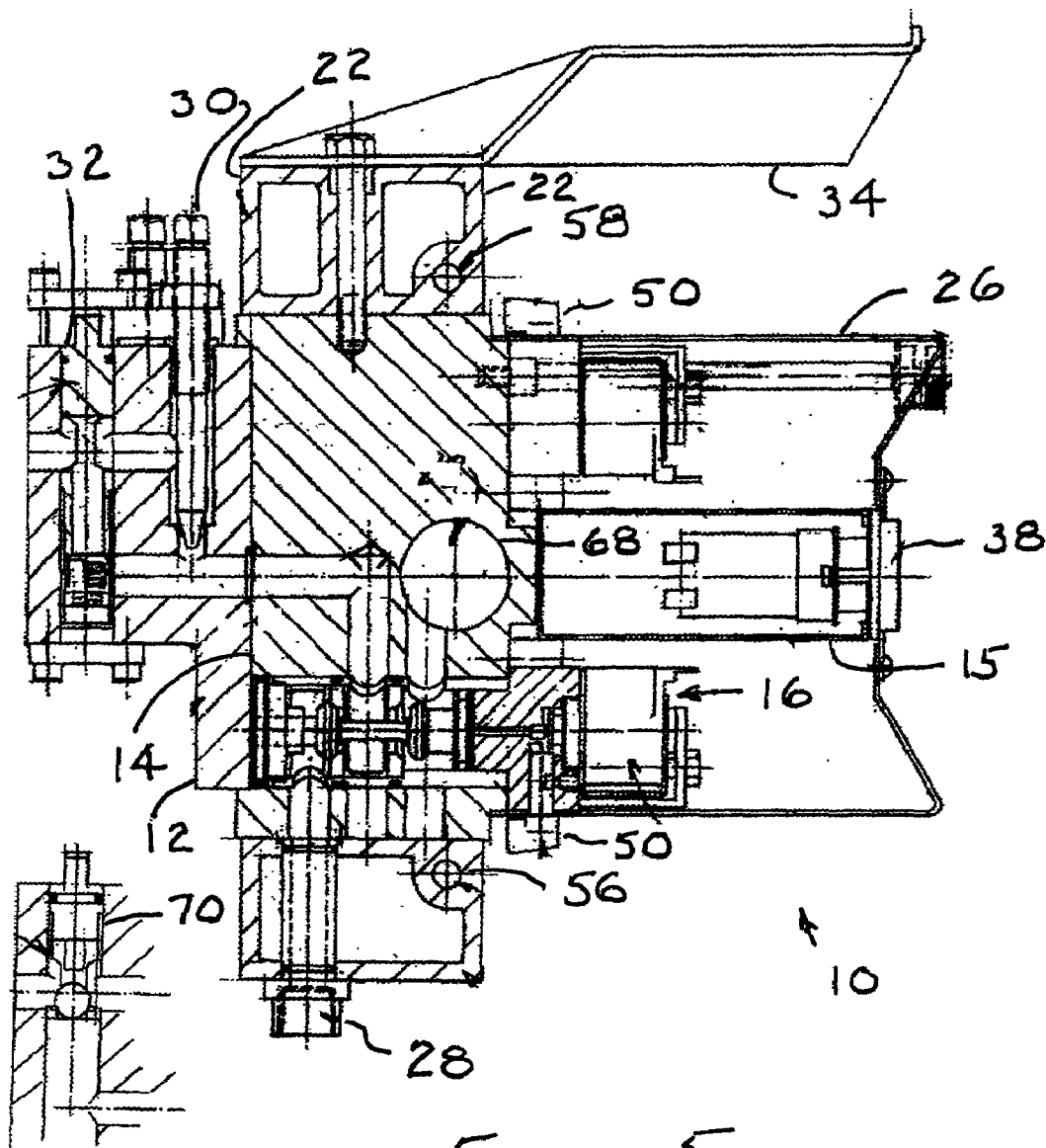
FIG. 5 is a section view taken along the line 5—5 of FIG. 4 illustrating the installation of the modular solenoid and valve assembly illustrated in FIG. 3 installed in the lower eleven positions within the valve block assembly.
FIG. 8 is a fragmentary section view illustrating a part of a ball check valve embodiment that is an alternate to the flat check valve embodiment illustrated in FIG. 5.
Figure 6:
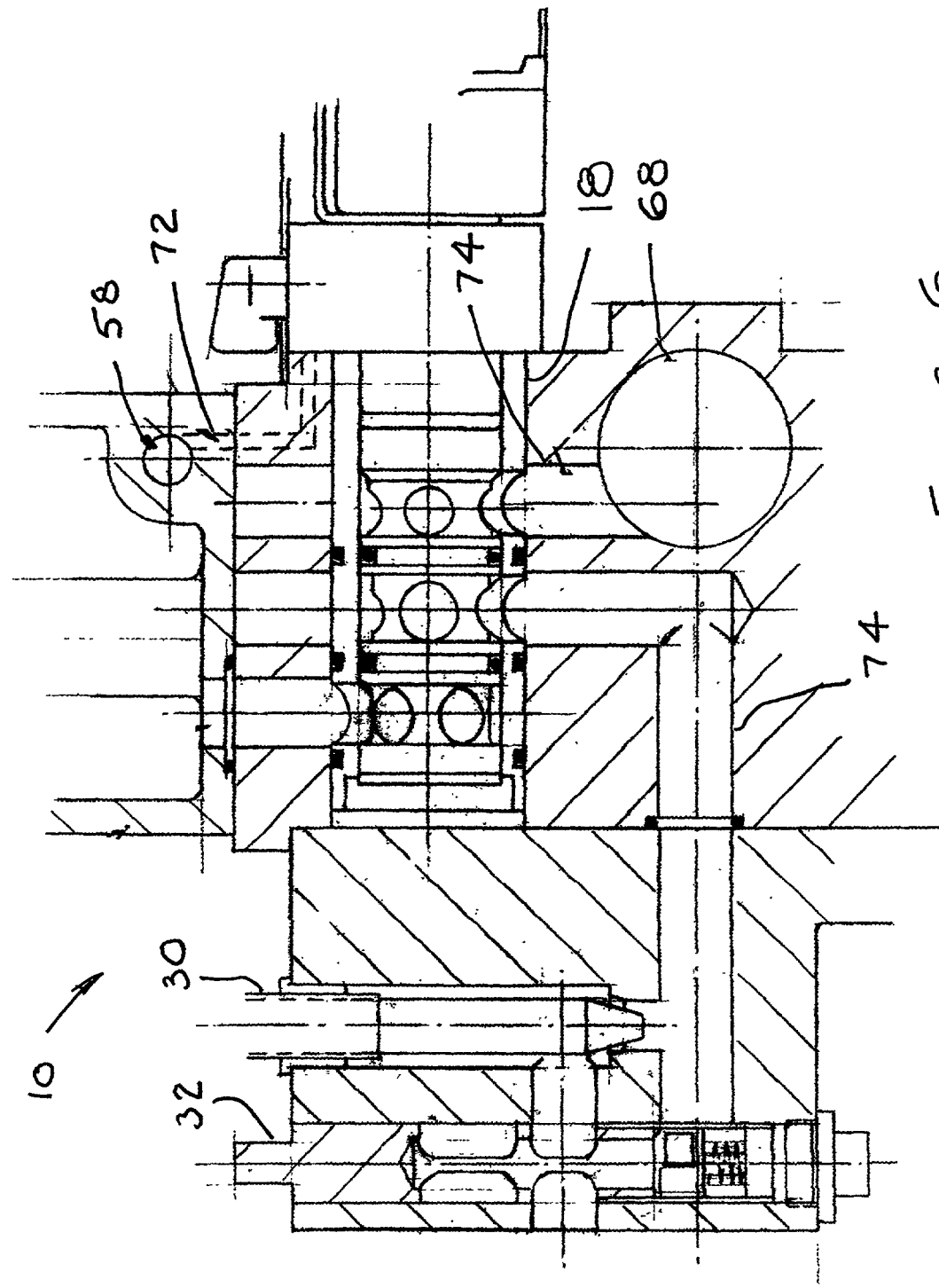
FIG. 6 is a section view taken along the line 6—6 illustrating the installation of the modular solenoid and valve illustrated in FIG. 2 installed in the upper ten positions within the valve block assembly.

The embodiment of the valve block assembly 10 in accordance with present invention and illustrated in FIGS. 1, 4 and 5 includes a flat check valve 32. When the flat check valve 32 is part of the structure the air flow is controlled by the control screw 30. Accordingly, the control screw 30 controls the output to the function being activated. When the solenoid is deactivated, exhaust air from the function opens the flat check valve 32 and air flows freely back through the normally closed poppet valve and into the exhaust port 68. Alternatively, a ball check 70, shown in FIG. 8, is installed in place of the flat check valve 32. Either check valve 32, 70 allows air to flow freely to the function being activated. When the solenoid 60 is deactivated air flows from the function to close the ball check 70, and air flows past the control screw 30 into the exhaust port 68. Some embodiments of the invention include a normally open poppet valve in place of the normally closed poppet valve, whereby air flows to the function when the valve is deactivated.

Manual overrides 50 are provided to operate machine functions manually. The interface of the solenoid valves, the start stop, maintenance stop, and gob load functions, to the controller (not shown), is accomplished by the wireway assembly 24. The wireway assembly 24 is attached to the cartridge block 14 by four screws 33. The solenoids 60 and the wireway assembly 24 are protected by the cover 26 that is secured by two threaded knobs 82. Thus, the cover 26 is easily removable to allow access to twenty-one such assemblies.

Figure 7:
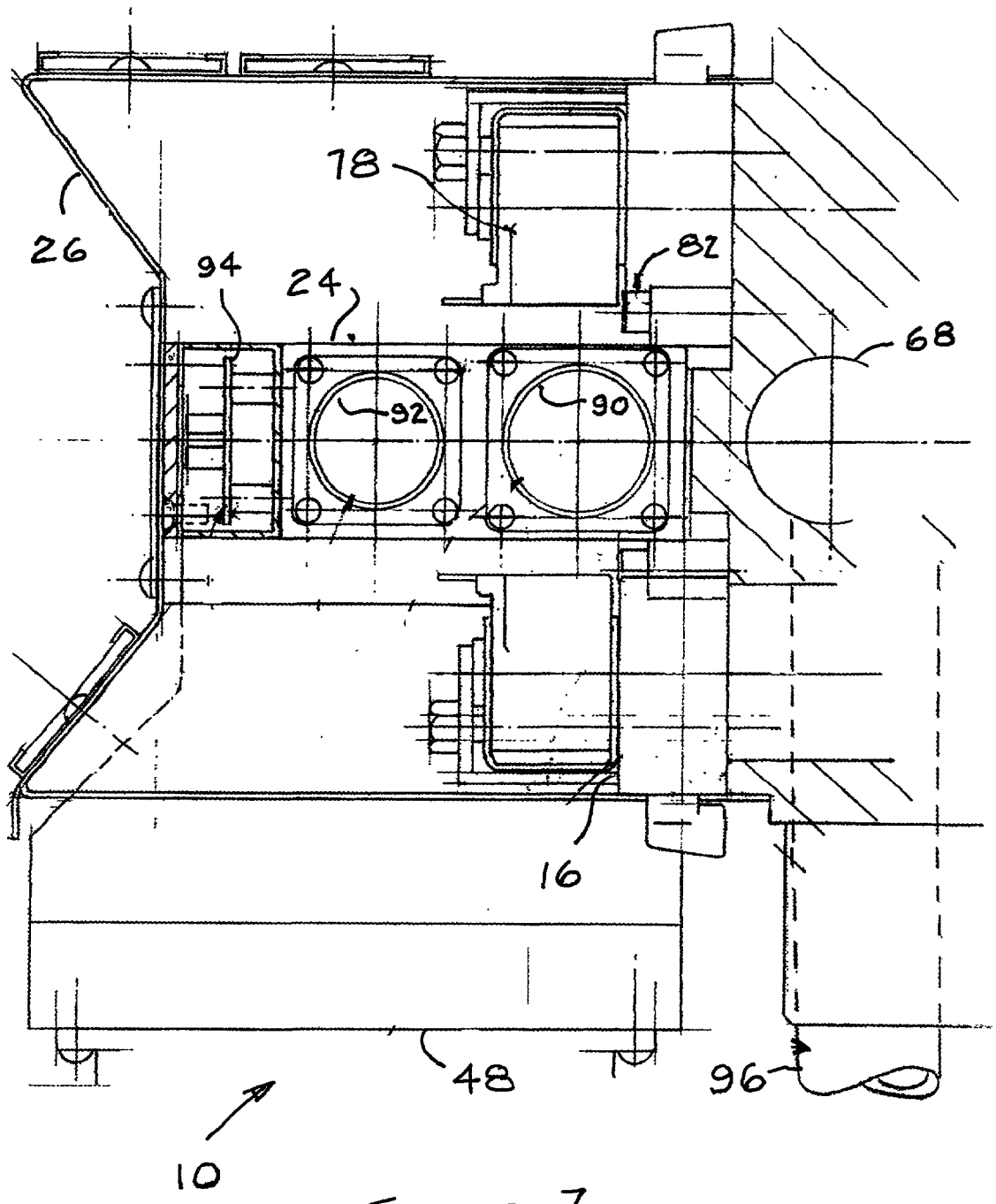
FIG. 7 is a section view taken along the line 7—7 of FIG. 4 illustrating a circuit board with LED displays for timing functions, round multi-pin connectors for a wiring harness for solenoids and, in some embodiments, for input of data such as external events.

As best seen in FIG. 1, the valve block assembly 10 further includes a sealing plate 80 and a retaining bar 82. A stud 84 extends from the cartridge block 14 to locate and fasten the cover 26 with respect to the rest of the valve block assembly 10. As best seen in FIG. 7, the valve block assembly 10 also includes a solenoid harness connector 90, an auxiliary event connector 92, a circuit board with an LED display 94 and an exhaust passage 96.

If maintenance is required the lamps, switches or cables, the cover 26 can be removed by unscrewing two internally threaded knobs. Thereafter, the complete wireway assembly 24 can be removed and replaced by removing four screws.

The lower eleven valves have enlarged valves and porting to reduce flow restrictions. The upper ten valves are mounted in respective sleeves and can be clamped so that the ports in the cartridge valve are always aligned optimally.

The complete valve block assembly has a smaller profile than the prior art apparatus and this results in better accessibility within the I.S. section while simultaneously providing even greater reliability than the prior art apparatus. Improved airflow to pilot and poppet valves is achieved to insure more precise machine operation.

The first and second modular pilot valve operated poppet valves assemblies 18 have a cylindrical contour in the preferred embodiment. This contour is particularly desirable because the structure can be manufactured from bar stock and therefore less machining is required to manufacture the parts. An additional advantage of the cylindrical contour is that cross-section is minimized and this facilitates a design that will fit within the available space envelope while still maximizing air flow to insure precise control. However, in various other embodiments of the invention the first and second modular pilot valve operated poppet valve assemblies 16, 18 may have a cross-section that is not round. The cross-section may be (a) any polygon including but not limited to regular polygons such as a square or (b) any other curvilinear form. In addition, various embodiments of the first and second modular pilot valve operated poppet valve assemblies 16, 18 may be constructed with a round cross-section to which, for example, strips may be added at the corners of the cross-section to create a square module. The cartridge block 14 in such embodiments will have cavities 15 dimensioned and configured to receive respective first and second modular pilot valve operated poppet valve assemblies 16, 18.

Major advantages of the apparatus in accordance with the present invention are the modular first and second pilot valve operated pilot valve assemblies that include all of the most reliability vulnerable components and a valve block assembly that makes each of the individual first and second modular pilot valve operated poppet valve assemblies 16, 18 accessible merely by removing the cover 34 and disengaging a retainer 21 that secures the individual valve assemblies 16, 18 without the need for moving any other structure.

The invention has been described with reference to the preferred embodiment. Persons skilled in the art of such inventions may upon exposure to the teachings herein, conceive other variations such variations are deemed to be encompassed by the disclosure, the invention being delimited only by the following claims.

We claim:

1. A valve block assembly for an I. S. glassware forming machine which comprises:
   a cartridge block and a plurality of modular pilot valve operated poppet valve assemblies, said cartridge block having a plurality of bores therein dimensioned and configured for receiving respective modular pilot valve operated poppet valve assemblies, said cartridge block having a first side, each of said bores extending from said first side into said cartridge block, each of said modular pilot valve operated poppet valve assemblies having a supply air port, an operating air out port and an exhaust passage, each of said modular pilot valve operated poppet valve assemblies being accessible for installation and removal from said cartridge block from said first side.

2. A valve block assembly in accordance with claim 1 further including a wireway enclosure for enclosing an associated wiring harnesses within the envelope thereof and for mounting associated controls, connectors and indicator displays.

3. A valve block assembly in accordance with claim 2 further including means for mounting said wireway enclosure to position said wireway enclosure proximate to said cartridge block and movement of said wireway enclosure away from cartridge block.

4. A valve block assembly in accordance with claim 1 wherein each of said pilot operated poppet valves comprises:
   a solenoid control valve having an input port for connection to an associated source of pilot air and an outlet port, said solenoid control valve having a first position and a second position, said position changing in response to being energized; and
   a poppet valve having a first port for connection to an associated source of control air, a second port for connection to associated apparatus being controlled and a third port for exhaust air passing from the associated apparatus being controlled, and a poppet, said poppet having an axes and being mounted for axial movement responsive to air pressure at said outlet port of said solenoid control valve, said poppet being axially movable between a first position in which said first and second ports are in fluid communication and a second position in which said second and third ports are in fluid communication, said modular pilot valve operated poppet valve assembly having exterior surfaces that are substantially cylindrical.

5. A valve block assembly in accordance with claim 4 wherein each of said modular pilot valve operated poppet valve assemblies is substantially rotationally symmetrical.

6. A valve block assembly in accordance with claim 5 wherein at least some of said modular pilot valve operated poppet valve assemblies includes a solenoid control valve that is substantially rotationally symmetrical.

7. A valve block assembly in accordance with claim 6 wherein said plurality of solenoid control valves and said poppet valves each have an axis and said solenoid valve and said poppet valve are disposed in substantially coaxial relationship.

8. A valve block assembly in accordance with claim 7 wherein at least some of said modular pilot valve operated poppet valve assemblies each of said plurality of solenoid control valves has said solenoid valve and poppet valve disposed in substantially end abutting relationship.

9. A valve block assembly in accordance with claim 8 further including a cover dimensioned and configured for covering said wireway enclosure and engaging said cartridge block.

10. A valve block assembly in accordance with claim 9 wherein said wireway has controls mounted thereon and said cover has openings disposed in registered relationship to said controls.

11. A valve block assembly for an I. S. glassware forming machine which comprises:
   a cartridge block and a plurality of modular pilot valve operated and poppet valve assemblies mounted in said cartridge block for individual installation and removal wherein said cartridge block, each of said pilot valve operated poppet valve assemblies having a supply air port, an operating air out port and an exhaust passage, and a wireway enclosure for holding an associated wiring harnesses within the envelope thereof and for mounting associated controls.

12. A valve block assembly in accordance with claim 11 further including means for mounting said wireway enclosure to permit mounting of said wireway enclosure proximate to said cartridge block and movement of said wireway enclosure away from cartridge block.

13. A valve block assembly in accordance with claim 12 further including a cover dimensioned and configured for covering said wireway assembly and engaging said cartridge block.

14. A modular pilot valve operated poppet valve assembly for use with an associated valve block assembly of an associated glassware manufacturing machine which comprises:
   a solenoid control valve having an input port for connection to an associated source of pilot air and an outlet port, said solenoid control valve having a first position and a second position, said position changing in response to being energized; and
   a poppet valve having a first port for connection to an associated source of control air, a second port for connection to associated apparatus being controlled and a third port for exhaust air passing from the associated apparatus being controlled, and a poppet, said poppet having an axis and being mounted for axial movement responsive to air pressure at said outlet port of said solenoid control valve, said poppet being axially movable between a first position in which said first and second ports are in fluid communication and a second position in which said second and third ports are in fluid communication, said modular pilot valve operated poppet valve assembly having exterior surfaces that are substantially cylindrical.

15. A modular pilot valve operated poppet valve assembly in accordance with claim 14 wherein said poppet valve is substantially rotationally symmetrical.

16. A modular pilot valve operated poppet valve assembly in accordance with claim 15 wherein said solenoid control valve is substantially rotationally symmetrical.

17. A modular pilot valve operated poppet valve assembly in accordance with claim 16 wherein said solenoid valve and said poppet valve each have an axis and said solenoid valve and said poppet valve are disposed in substantially coaxial relationship.

18. A modular pilot valve operated poppet valve assembly in accordance with claim 17 wherein said solenoid valve and poppet valve are disposed in substantially end abutting relationship.

19. A modular pilot valve operated poppet valve assembly for use with an associated valve block assembly of an associated glassware manufacturing machine which comprises:
   a solenoid control valve having an input port for connection to an associated source of pilot air and an outlet port, said solenoid control valve having a first position and a second position, said position changing in response to being energized; and
   a poppet valve having a first port for connection to an associated source of control air, a second port for connection to associated apparatus being controlled and a third port for exhaust air passing from the associated apparatus being controlled, and a poppet, said poppet having an axis and being mounted for axial movement responsive to air pressure at said outlet port of said solenoid control valve, said poppet being axially movable between a first position in which said first and second ports are in fluid communication and a second position in which said second and third ports are in fluid communication, said modular pilot valve operated poppet valve assembly having exterior surfaces that dimensioned and configured for mounting in the associated valve block assembly.

20. A valve block assembly in accordance with claim 1 wherein each of said pilot operated poppet valves comprises:

a solenoid control valve having an input port for connection to an associated source of pilot air and an outlet port, said solenoid control valve having a first position and a second position, said position changing in response to being energized; and a poppet valve having a first port for connection to an associated source of control air, a second port for connection to associated apparatus being controlled and a third port for exhaust air passing from the associated apparatus being controlled, and a poppet, said poppet having an axis and being mounted for axial movement responsive to air pressure at said outlet port of said solenoid control valve, said poppet being axially movable between a first position in which said first and second ports are in fluid communication and a second position in which said second and third ports are in fluid communication, said modular pilot valve operated poppet valve assembly having exterior surfaces dimensioned and configured for engagement with said bores.

* * * * *